(12) United States Patent
Kwon et al.

(10) Patent No.: US 9,449,421 B2
(45) Date of Patent: Sep. 20, 2016

(54) METHOD AND APPARATUS FOR RENDERING IMAGE DATA

(71) Applicant: Samsung Electronics Co., Ltd., Suwon-si (KR)

(72) Inventors: Kwon-taek Kwon, Seoul (KR); Seok-yoon Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 96 days.

(21) Appl. No.: 14/190,406

(22) Filed: Feb. 26, 2014

(65) Prior Publication Data

US 2015/0091892 A1    Apr. 2, 2015

(30) Foreign Application Priority Data

Oct. 2, 2013  (KR) .................... 10-2013-0118131

(51) Int. Cl.
   *G06T 15/00*    (2011.01)
(52) U.S. Cl.
   CPC .................. *G06T 15/005* (2013.01)

(58) Field of Classification Search
None
See application file for complete search history.

(56) References Cited

U.S. PATENT DOCUMENTS

| | | |
|---|---|---|
| 7,456,846 B1 | 11/2008 | King et al. |
| 2010/0177105 A1 | 7/2010 | Nystad et al. |
| 2011/0199377 A1 | 8/2011 | Jang et al. |
| 2012/0176386 A1 | 7/2012 | Hutchins |
| 2015/0187123 A1* | 7/2015 | Hwang ............... G06T 1/20 345/421 |
| 2016/0027144 A1* | 1/2016 | Fernandez ............ G06T 1/60 345/522 |

* cited by examiner

*Primary Examiner* — Peter Hoang
(74) *Attorney, Agent, or Firm* — NSIP Law (57) ABSTRACT

Provided is a rendering method and apparatuses for rendering image data. The rendering method includes generating a primitive list by performing geometry processing on a current tile to be rendered; determining whether the current tile is identical to a previous tile from among tiles included in a previously rendered frame; and in response to the previous tile being identical to the current tile, generating an image of the current tile by re-using an image of the previous tile.

16 Claims, 5 Drawing Sheets

METHOD AND APPARATUS FOR RENDERING IMAGE DATA

RELATED APPLICATIONS

This application claims the benefit under 35 U.S.C. §119(a) of Korean Patent Application No. 10-2013-0118131, filed on Oct. 2, 2013, in the Korean Intellectual Property Office, the entire disclosure of which is hereby incorporated by reference for all purposes.

BACKGROUND

1. Field

The following description relates to methods and apparatuses for rendering three-dimensional (3D) data.

2. Description of Related Art

Three-dimensional (3D) graphics application program interface (API) standards include OpenGL, OpenGL ES, and Direct 3. API standards include a method of performing rendering on each frame and displaying an image. Rendering includes geometry processing and pixel processing. The geometry processing is a process of dividing objects included in a 3D space into a plurality of primitives, and the pixel processing is a process of determining colors of the primitives. When rendering is performed on each frame, a large amount of computation is performed and a large amount of power is consumed. Accordingly, when rendering is performed, it is advantageous to reduce a computational amount and the number of accesses to a memory.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect there is provided a rendering method including generating a primitive list by performing geometry processing on a current tile to be rendered; determining whether the current tile is identical to a previous tile from among tiles included in a previously rendered frame; and in response to the previous tile being identical to the current tile, generating, at a pixel processor, an image of the current tile by re-using an image of the previous tile.

The determining may comprise determining that the current tile is identical to the previous tile based on at least one of whether the current tile and the previous tile are included in same render target, whether the current tile and the previous tile have same tile attributes, or whether the current tile and the previous tile include same primitive list.

The tile attributes may comprise at least one of coordinates or a size of a tile.

The rendering method may further comprise, in response to no previous tile being identical to the current tile, generating the image of the current tile by performing pixel processing on the current tile, and generating a final image by combining images generated for all tiles included in a current frame.

The generating of the current image may comprise generating of the current image by copying the image of the previous tile to an image area of the current tile.

The generating of the current image may comprise generating of the current image by setting a pointer of an image area of the current tile to indicate an image area of the previous tile.

The previous tile may comprise at least one of an image, information about a tile attribute, a processing order in which primitive lists are processed, or a draw identification (ID).

The performing of the geometry processing may comprise, in response to a previous draw command being identical to a draw command of the current tile, performing geometry processing on the current tile using a primitive list generated by geometry processing of the previous draw command.

In another general aspect there is provided a rendering apparatus including a geometry processor configured to generate a primitive list by performing geometry processing on a current tile to be rendered; and a pixel processor configured to determine whether the current tile is identical to a previous tile from among previous tiles included in a previous rendered frame, and to generate an image of the current tile by re-using an image of the previous tile in response to the previous tile being identical to the current tile.

The pixel processor determines that the current tile and the previous tile are identical to each other based on at least one of whether the current tile and the previous tile are included in same render target, the current tile and the previous tile have same tile attribute, or the current tile and the previous tile include same primitive list.

The tile attribute may comprise at least one of coordinates or a size of a tile.

In response to no previous tile being identical to the current tile, the pixel processor may be further configured to generate the image of the current tile by performing pixel processing on the current tile, and to generate a final image by combining images generated for all tiles included in a current frame.

The pixel processor may be further configured to re-uses the image of the previous tile by copying the image of the previous tile to an image area of the current tile.

The pixel processor may be further configured to re-uses the image of the previous tile by setting a pointer of an image area of the current tile to indicate an image area of the previous tile.

The previous tile may comprise at least one of an image, information about a tile attribute, a processing order in which primitive lists are processed, or a draw identification (ID).

In response to a previous draw command being identical to a draw command of the current tile, the geometry processor may be further configured to perform geometry processing on the current tile using a primitive list that is generated by geometry processing of the previous draw command.

In another general aspect there is provided a rendering apparatus including a geometry processor configured: to determine whether a current draw command for a current tile is identical to a previous draw command, in response to the current draw command and the previous draw command being identical, to output a result of geometric processing based on the primitive list of the previous draw command, and in response to the current draw command and the previous draw command not being identical, to geometry process the current tile to generate primitive list; and a pixel processor configured to generate an image of the current tile by re-using an image of a previous tile in response to the previous tile being identical to the current tile.

The geometry processor may determine that the current draw command and the previous draw command are identical to each other based on binding information of the current draw command and the previous draw command, and wherein the binding information comprises at least one of vertex attribute data, index data, vertex shader binary, uniform data, texture data, or configuration data.

The geometry processor may be further configured to store the generated primitive list and the corresponding current draw command.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
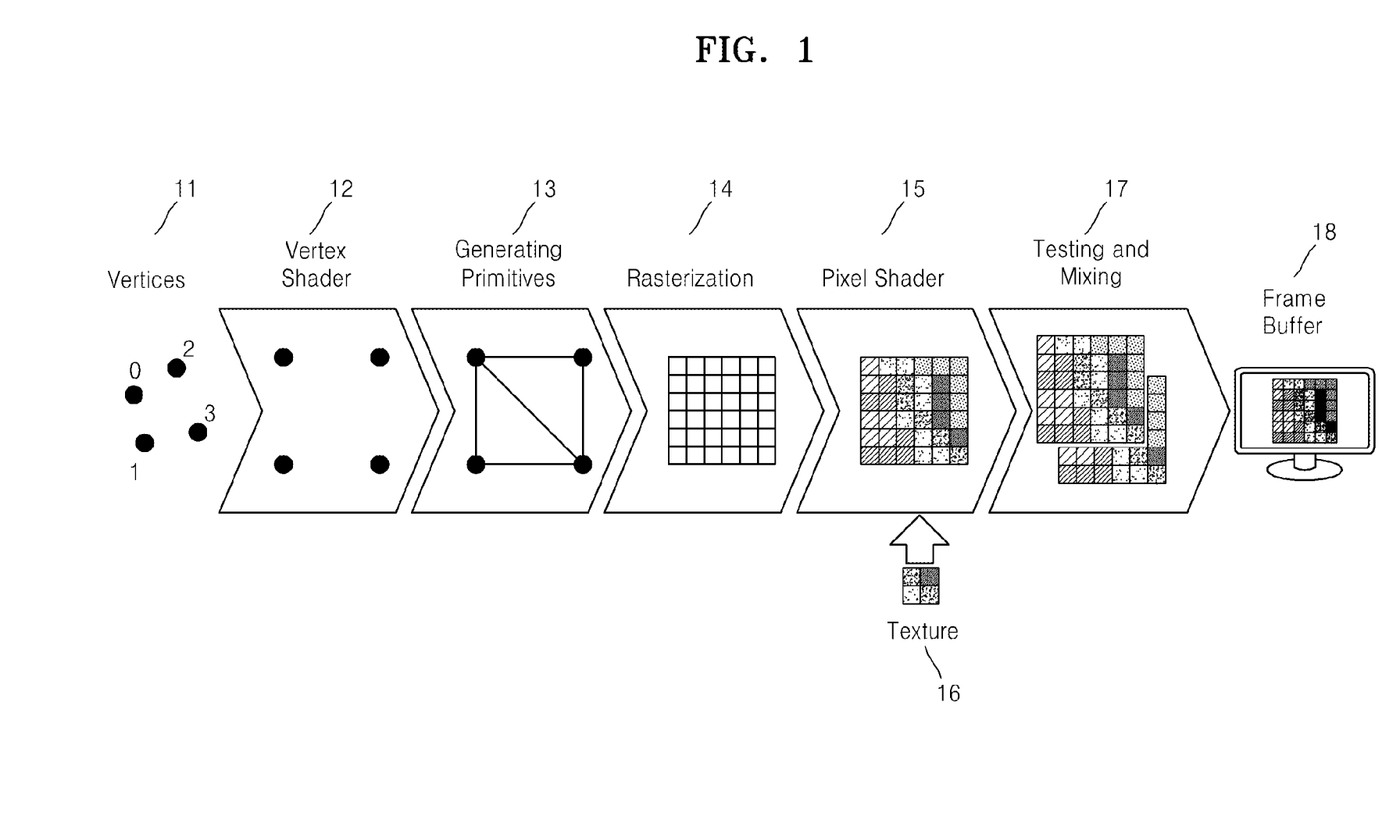
FIG. 1 is a diagram illustrating an example of a process of processing a three-dimensional (3D) image.

FIG. 1 is a diagram illustrating an example of a process of processing a three-dimensional (3D) image, the process including operations 11 through 17. The operations in FIG. 1 may be performed in the sequence and manner as shown, although the order of some operations may be changed or some of the operations omitted without departing from the spirit and scope of the illustrative examples described. The operations 11 through 13 are operations of performing geometry processing, and the operations 14 through 17 are operations of performing pixel processing.

The operation 11 is an operation of generating vertices indicating an image. The vertices are generated in order to describe objects included in the image. The operation 12 is an operation of shading the generated vertices. A vertex shader may perform shading on the vertices by assigning colors to the vertices generated in the operation 11.

The operation 13 is an operation of generating primitives. The term 'primitive' refers to a polygon that is formed of points, lines, or vertices. For example, the primitives may be triangles formed by connecting three vertices.

The operation 14 is an operation of rasterizing a primitive. When the primitive is rasterized, the primitive is divided into a plurality of fragments. The term 'fragment' refers to a portion of a primitive and may be a basic unit for performing image processing. A primitive includes only information about vertices. Accordingly, interpolation is performed when fragments between vertices are generated during rasterization.

The operation 15 is an operation of shading pixels. Although shading is performed in units of pixels, shading may also be performed in units of fragments. For example, when pixels or fragments are shaded, colors of the pixels or the fragments are assigned to pixels of fragments.

The operation 16 is an operation of texturing the pixels or the fragments. Texturing is a method of using a previously generated image to designate a color of a pixel or a fragment. For example, when a color is designated to a fragment, shading is performed through computation whereas texturing is a method of assigning the same color as a color of an image, which has been previously generated to a fragment corresponding to the image.

In the operation 15 or 16, a large computational amount is required in order to shade or texture each pixel or fragment. Accordingly, it is advantageous to reduce the computational amount by more efficiently performing shading or texturing. An example of a method of reducing the computational amount during shading is hidden surface removal (HSR). HSR is a method that does not perform shading on a first object covered by a second object that is disposed in front of the first object.

The operation 17 is an operation of performing testing and mixing. The operation 18 is an operation of displaying a frame that is stored in a frame buffer. A frame generated through the operations 11 through 17 is stored in the frame buffer. The frame that is stored in the frame buffer is displayed on a display device.

Figure 2:
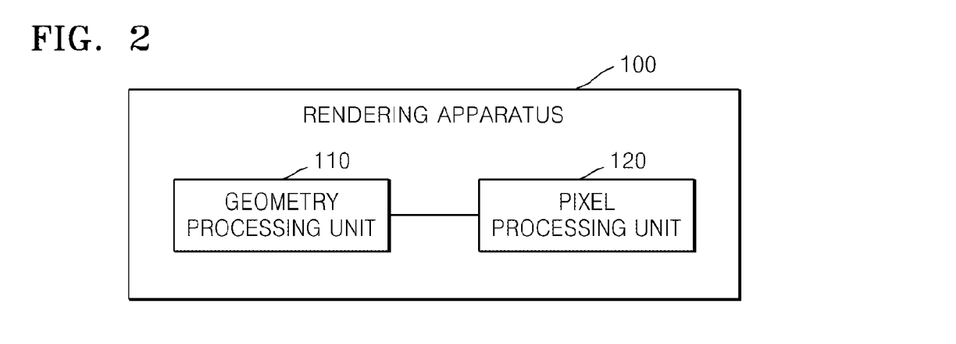
FIG. 2 is a diagram illustrating an example of a rendering apparatus.

FIG. 2 is a diagram illustrating an example of a rendering apparatus 100. Referring to FIG. 2, the rendering apparatus 100 performs rendering on a current frame by using a result of rendering performed on a previous frame. The rendering apparatus 100 includes a geometry processing unit 110 and a pixel processing unit 120.

The geometry processing unit 110 receives a draw command, and performs geometry processing according to the received draw command. The geometry processing unit 110 generates a primitive list in response to the draw command. If an input draw command is identical to a draw command that has been previously processed, the geometry processing unit 110 does not need to repeat the same computation.

The geometry processing unit 110 performs geometry processing on the current frame by using a result of rendering performed on the previous frame. The geometry processing unit 110 uses a result of geometry processing performed in response to the previous draw command.

When a current draw command is input, the geometry processing unit 110 determines if there is a previous draw command that is identical to the current draw command. The geometry processing unit 110 may compare binding information and may determine whether the current and previous draw commands are identical. The geometry processing unit 110 compares binding information of the current draw command with binding information of previous draw command. Because of the comparison, the geometry processing unit 110 determines a previous draw command that has binding information identical to the binding information of the current draw command.

The term 'binding information' refers to information indicating which data a draw command uses as an input. Examples of input data used by a draw command may include, but is not limited to, vertex attribute data, index data, vertex shader binary, uniform data, texture data, and configuration data.

The geometry processing unit 110 stores in a scene buffer 150 the primitive list indicating the result of the geometry processing performed on the previous draw command. The geometry processing unit 110 outputs a result of geometry processing for the current draw command by using the primitive list of the previous draw command, without performing geometry processing in response to the current draw command. Since the current draw command and the previous draw command are identical to each other, the geometry processing unit 110 need not perform geometry processing in response to the current draw command and uses the result of the geometry processing performed in response to the previous draw command to respond to the current draw command. Accordingly, the geometry processing unit 110 performs geometry processing for the current draw command by storing the primitive list of the previous draw command in the scene buffer 150.

When there is no previous draw command identical to the current draw command, the geometry processing unit 110 performs geometry processing in response to the current draw command, and stores a primitive list that is generated as a result of the geometry processing in the scene buffer 150. Since there is no previous draw command identical to the current draw command, the geometry processing unit 110 has no previous data to use. Accordingly, the geometry processing unit 110 generates a primitive list by performing geometry processing in response to the current draw command, and stores the generated primitive list in the scene buffer 150.

The geometry processing unit 110 determines primitive lists for all input draw commands, and stores the determined primitive lists in the scene buffer 150. When all draw commands for a current frame are processed, the geometry processing unit 110 ends geometry processing for the current frame.

The geometry processing unit 110 and the pixel processing unit 120 use tile-based rendering. That is, the geometry processing unit 110 and the pixel processing unit 120 divide one frame into a grid of sections, and independently render each of the sections. Each section is called a tile.

When one frame is formed of a plurality of tiles, the pixel processing unit 120 may re-use an image of the previous frame for a tile that has no change between the previous frame and the current frame. For a tile that has a change between the previous frame and the current frame, the pixel processing unit 120 may generate an image by performing rendering.

The pixel processing unit 120 performs pixel processing on the current frame by using the primitive lists that are stored in the scene buffer 150. The pixel processing 120 uses a result of pixel processing of the previous frame. The pixel processing unit 120 renders the current frame by re-using tiles that are generated as a result of rendering of the previous frame.

The pixel processing unit 120 determines whether there is a previous tile that is identical to a current tile, and renders the current tile based on whether or not an identical tile is present. When there is a previous tile that is identical to the current tile, the pixel processing unit 120 re-uses an image of the previous tile. The image of the previous tile is an image that is generated by rendering the previous tile. When there is no previous tile that is identical to the current tile, the pixel processing unit 120 performs rendering on the current tile, i.e., the pixel processing unit 120 performs shading on each of pixels included in the current tile.

The pixel processing unit 120 renders all the tiles included in the current frame, and generates a final image by using the rendered tiles. A method of generating each tile may vary based on whether or not an identical previous tile is present. The pixel processing unit 120 generates a final image by mapping an image that is generated by re-using a previous image to an image that is generated by performing shading.

The pixel processing unit 120 determines a previous tile that is identical to the current tile from among previous tiles included in a previously rendered frame. The term "previous frame" refers to a frame that has already been rendered and whose image has already been generated, and when a previous frame is divided into a grid of sections, the term "previous tile" refers to each of the sections. The term "current frame" refers to a frame that is currently being rendered, and when a current frame is divided into a grid of sections, the term "current tile" refers to each of the sections.

The pixel processing unit 120 determines that the current tile and the previous tile are identical to each other based on whether the current tile and the previous tile are included in the same render target, have the same tile attribute, and include the same primitive list.

The pixel processing unit 120 determines whether the current tile and the previous tile are included in the same render target. The pixel processing unit 120 generates an image of the render target before generating a final image, and then generates the final image by performing re-rendering by using the image of the render target as an input texture. The pixel processing unit 120 may generate and use a plurality of intermediate images (of a render target) in order to generate a final image for one frame. Accordingly, when the current tile and the previous tile are included in the same render target, the pixel processing unit 120 determines that the current tile and the previous tile are identical to each other. When applications use the same frame buffer object without changing an attribute of the frame buffer object according to a graphics application program interface (API) standard, the pixel processing unit 120 may determine that the current tile and the previous tile are included in the same render target.

The pixel processing unit 120 determines whether the current tile and the previous tile have the same tile attribute. A tile attribute includes coordinates and a size of a tile. The coordinates of the tile indicate a position of the tile. The size of the tile indicates horizontal and vertical lengths of the tile. Accordingly, the pixel processing unit 120 determines that the current tile and the previous tile are identical to each other based on whether the current tile and the previous tile have the same coordinates and the same size.

The pixel processing unit 120 determines whether the current tile and the previous tile include the same primitive list. The term "primitive list" is a result of geometry processing. The geometry processing unit 110 performs geometry processing on the previous tile and generates a primitive list for the previous tile. The geometry processing unit 110 also performs geometry processing on the current tile, and generates a primitive list for the current tile. The pixel processing unit 120 compares the primitive list of the current tile with the primitive list of the previous tile to determine that the current tile and the previous tile are identical based on whether the primitive lists of the current tile and the previous tile are identical to each other.

The pixel processing unit 120 compares draw IDs of the primitive lists, and determines that the primitive lists of the current tile and the previous tile are identical to each other based on whether the draw IDs of the primitive lists are identical to each other. During geometry processing, the geometry processing unit 110 stores input draw commands in a draw command history buffer 130, and assigns IDs to the draw commands. Duplicate draw commands are stored only once and have the same ID. That is, draw commands that are identical to each other have the same ID. The geometry processing unit 110 performs geometry processing based on an input draw command, and generates a primitive list as a result of the geometry processing. The generated primitive list is based on an ID of the input draw command. Accordingly, the pixel processing unit 120 may determine whether primitive lists are identical to each other by comparing the draw IDs of the primitive lists.

The pixel processing unit 120 renders the current tile by using an image of the previous tile. The pixel processing unit 120 may re-use an image of the previous tile that is identical to the current tile by copying an image of the previous tile to an image area of the current tile. The pixel processing unit 120 may copy an image of the previous tile that has been previously stored in a storage space to an image area of the current tile. For example, the image of the previous tile may be stored in a frame history buffer 160, and an image of the current tile may be stored in the frame buffer 170. The pixel processing unit 120 may copy the image of the previous tile that from the frame history buffer 160 and store it in the frame buffer 170.

Alternatively, the pixel processing unit 120 may re-use an image of the previous tile that is identical to the current tile by connecting a pointer to an image area of the current tile to indicate an image area of the previous tile. That is, the pixel processing unit 120 may omit a process of copying an image of the previous tile, and may re-use the image of the previous tile by designating an address that identifies a storage space in which the image of the previous tile is stored. When the image of the previous tile is stored in the frame history buffer 160 and an image of the current tile is stored in the frame buffer 170, the pixel processing unit 120 stores a pointer that indicates an address of the image of the previous tile stored in the frame history buffer in an area of the frame buffer for the current tile. Since an image that is stored in a memory is re-used by using a pointer, a process of reading from and writing to the memory is omitted (that is, a memory bandwidth is reduced). Accordingly, the pixel processing unit 120 may generate a final image by using an image stored in a storage space that is identified by the address indicated by the pointer stored in the frame buffer.

The pixel processing unit 120 stores a tile that has been completely rendered in the frame history buffer 160. The pixel processing unit 120 stores an image of the tile, information about a tile attribute of the tile, a processing order in which primitive lists are processed, and a draw ID. The term "image of a tile" refers to an image that is generated by rendering a tile. The term "information about a tile attribute of a tile" refers to information including a position and a size of a tile. The term "processing order in which primitive lists are processed" refers to which primitive list is first processed from among primitive lists included in a tile. The term "draw ID" refers to an ID of a draw command that is used to generate a tile. The pixel processing unit 120 stores additional information along with the image of the tile and uses the additional information when the image of the tile is re-used.

When there is no previous tile that is identical to the current tile, the pixel processing unit 120 generates an image of the current tile by performing pixel processing on the current tile. Since there is no previous tile that is identical to the current tile, the pixel processing unit 120 generates a new image by using an existing method for the current tile.

The pixel processing unit 120 generates a final image by combining images that are generated for all tiles included in the current frame. The pixel processing unit 120 generates images of tiles that are generated by dividing the current frame, and generates a final image by mapping the generated images to areas of the final image.

Figure 3:
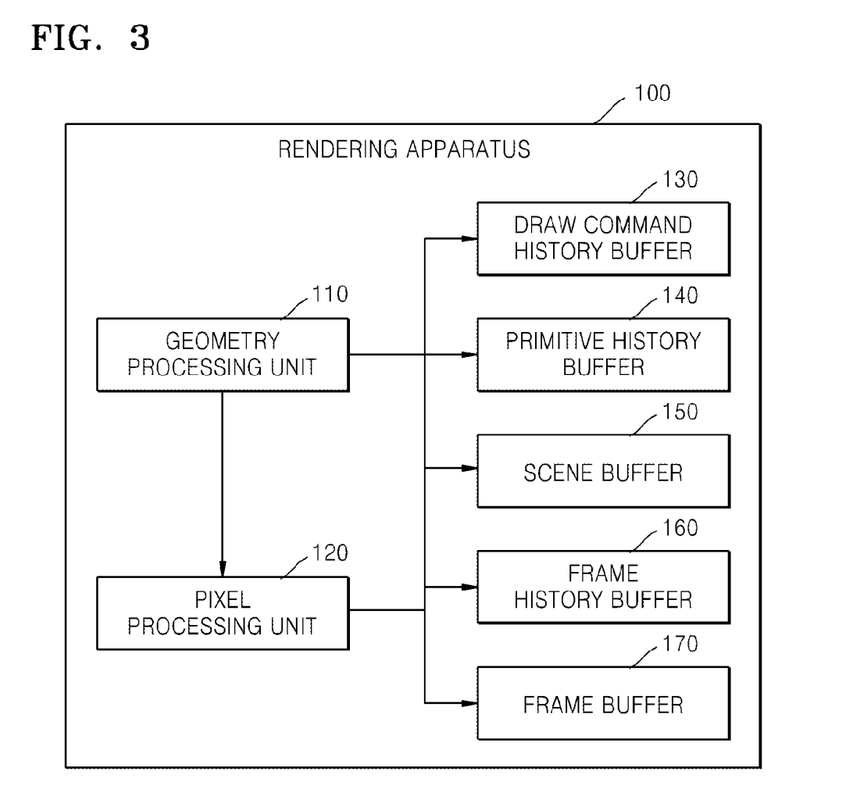
FIG. 3 is a diagram illustrating an example of a rendering apparatus.

FIG. 3 is a diagram illustrating an example of the rendering apparatus 100. The description of the rendering apparatus 100 in FIG. 2 is also applicable to the rendering apparatus 100 of FIG. 3, and thus will not be repeated here. Referring to FIG. 3, the rendering apparatus 100 further includes a draw command history buffer 130, a primitive history buffer 140, a scene buffer 150, a frame history buffer 160, and a frame buffer 179. The buffers 130 through 170 are memories or caches.

The draw command history buffer 130 stores information about an input draw command. For example, the draw command history buffer 130 may store binding information of draw commands for previous n number of frames. Accordingly, when comparing the draw commands, the geometry processing unit 110 uses the binding information that is stored in the draw command history buffer 130.

The primitive history buffer 140 stores a result of geometry processing that is performed in response to a draw command. The primitive history buffer 140 stores a primitive list that is generated by geometry processing. The geometry processing unit 110 may load the primitive list that is stored in the primitive history buffer 140 to the scene buffer 150.

The binding information that is stored in the draw command history buffer 130 and the primitive list that is stored in the primitive history buffer 140 correspond to each other. The binding information of the draw command history buffer 130 includes a pointer for the primitive list. When the binding information of a drawing command in the draw command history buffer 130 is identical to the binding information of a current draw command, the geometry processing unit 110 loads a primitive list that is indicated by the pointer included in the binding information stored in the draw command history buffer 130 to the scene buffer 150.

The scene buffer 150 stores primitive lists. The primitive lists that are stored in the scene buffer 150 are primitive lists for a current frame that is to be rendered. The pixel processing unit 120 generates an image of the current frame by performing rendering using the primitive lists that are stored in the scene buffer 150.

The frame history buffer 160 stores a result of pixel processing for a previous frame. That is, the frame history buffer 160 stores an image of the previous frame. An image may be stored in the frame history buffer 160 for every target rendered.

The frame history buffer 160 also stores information about a tile. The frame history buffer 160 stores a resulting image and attribute information of the tile. The frame history buffer 160 also stores a processing order in which primitive lists used to generate an image of the tile are processed and a draw ID.

When pixel processing for one render target is completed, the pixel processing unit 120 stores tiles included in the rendered target and information about the tiles in the frame history buffer 160.

The frame buffer 170 stores images of tiles included in a current target that is rendered. The frame buffer 170 may also store a pointer that indicates an address to identify a storage space in which an image of a tile is stored. The pixel processing unit 120 generates a final image by using the images of the tiles stored in the frame buffer 170.

Figure 4:
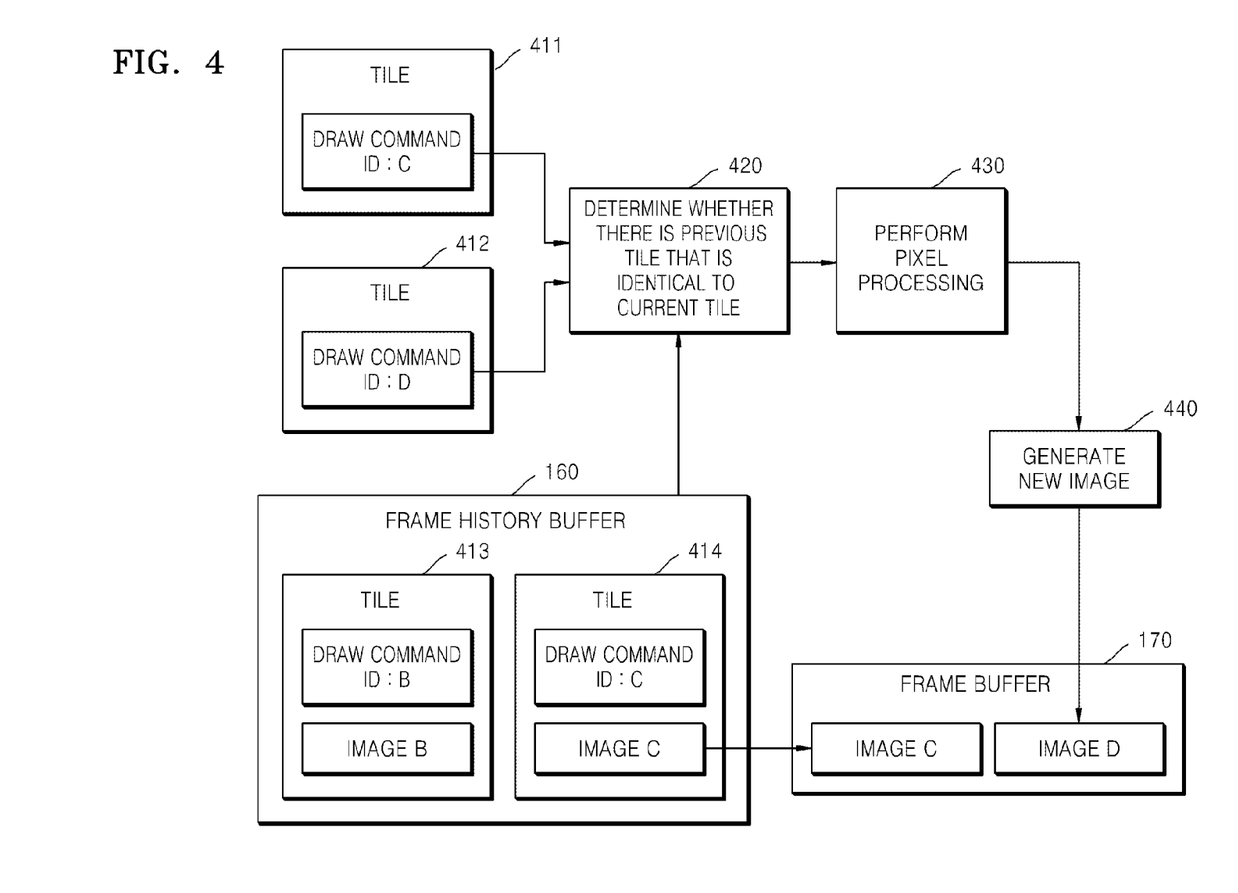
FIG. 4 is a diagram illustrating an example of rendering method using an image of a previous tile.

FIG. 4 is a diagram illustrating an example of a method for rendering using an image of a previous tile. Although, in the example shown in FIG. 4, pixel processing is performed on two tiles, tiles 411 and 412, in FIG. 4, more tiles may be input to the pixel processing unit 120. Referring to FIG. 4, the pixel processing unit 120 performs pixel processing based on to whether a previous tile that is identical to an input tile is present or not.

The tile 411 and the tile 412 are input to the pixel processing unit 120. A primitive list of the tile 411 has C as draw ID information. A primitive list of the tile 412 has D as draw ID information.

In operation 420, the pixel processing unit 120 compares the input tiles 411 and 412 with previous tiles 413 and 414 that are stored in the frame history buffer 160. The pixel processing unit 120 may compare draw command IDs included in the tiles 411 and 412 with draw command IDs of the previous tiles 413 and 414 and may determine whether the input tiles 411 and 412 and the previous tiles 413 and 414 are identical or not.

The file 411 has C as a draw command ID that is identical to that of the tile 414 stored in the frame history buffer 160. Accordingly, for tile 411, the pixel processing unit 120 does not proceed to operation 430, and stores an image C of the tile 414 in the frame buffer 170. Alternatively, the pixel processing unit 120 may store a pointer indicating an address to identify a storage space where the image C is stored in the frame buffer 170.

The tile 412 does not have a draw command ID that is identical to that of any of the tiles stored in the frame history buffer 160. Accordingly, for tile 412, the pixel processing unit 120 proceeds to operation 430, and performs pixel processing on tile 412.

In operation 440, the pixel processing unit 120 generates a new image as a result of the pixel processing performed on the tile 412. The pixel processing unit 120 stores an image D of the tile 412 in the frame buffer 170.

When an additional tile is input, the pixel processing unit 120 generates an image of the tile through the operations described above. The pixel processing unit 120 generates a final image using the images that are generated for each tile. The pixel processing unit 120 generates a final image of a current frame by using images stored in the frame buffer 170.

Since the pixel processing unit 120 generates the image D for the tile 412 for which a draw command ID was not found in the frame history buffer 160, the pixel processing unit 120 stores both attribute information and the image D of the tile 412 in the frame history buffer 160.

Figure 5:
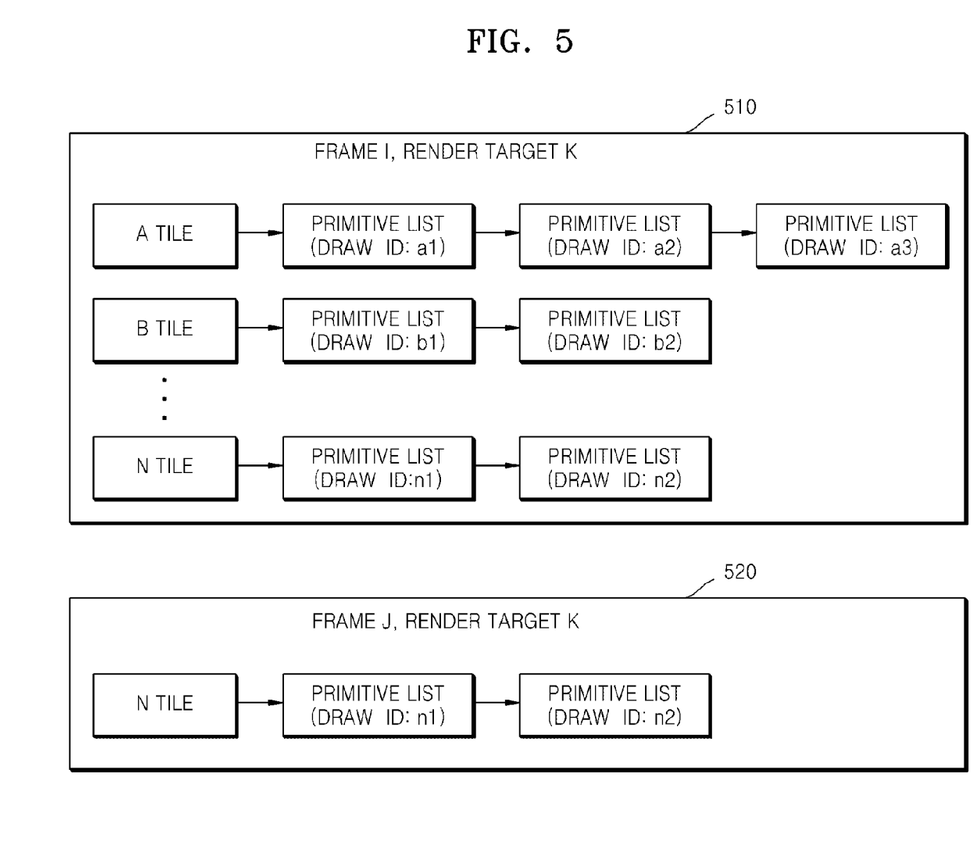
FIG. 5 is a diagram illustrating an example of structure in which data on a previous frame is stored.

FIG. 5 is a diagram illustrating an example of a structure in which data on a previous frame is stored. In FIG. 5, a render target K 510 of a frame I denotes a render target of the frame I, and a render target K 520 of a frame J denotes a render target of the frame J. A frame includes a plurality of render targets. A render target is an object to be rendered among a plurality of objects in the frame. Also, a plurality of tiles are included in the render target.

The frame I is a frame that has been completely rendered. The frame I includes an A tile through an N tile. The A tile includes multiple primitive lists, and each of the primitive lists has a draw ID. For example, the primitive lists included in the A tile have a1, a2, and a3 as draw IDs. Primitive lists included in the B tile have b1 and b2 as draw IDs. Primitive lists included in the N tile have n1 and n2 as draw IDs.

Primitive lists included in each tile are stored in a processing order. For example, in the A tile, since the primitive list having a1 as a draw ID is stored and then the primitive list having a2 as a draw ID a2 is stored, the primitive list having a1 as a draw ID is processed earlier than the primitive list having A2 as a draw ID.

The frame I is stored in the frame history buffer 160, and the frame J is stored in the frame buffer 170. That is, the frame I denotes a frame that has already been rendered, and the frame J denotes a frame that is currently being rendered. Although only the render target K 510 of the frame I and the render target K 520 of the frame J are shown in FIG. 5, a plurality of targets to be rendered for the frame I are stored in the frame history buffer 160, and a plurality of targets to be rendered for the frame J are stored in the frame buffer 170.

When a current tile and the N tile are identical to each other, the pixel processing unit 120 stores an image and additional information of the N tile in the frame buffer 170. The pixel processing unit 120 compares the current tile with tiles that are stored in the frame history buffer 160. Here, since the N tile is included in the render target K 510, the current tile is included in the render target K 510. Also, the current tile has n1 and n2 as draw IDs and the N tile has n1 and n2 as draw IDs, therefore, the current tile and the N tile have the same draw IDs. Since the current tile and the N tile have the same draw IDs, the current tile and the N tile include the same primitive lists. Finally, when the current tile and the N tile have the same tile attribute, the pixel processing unit 120 determines that the current tile and the N tile are identical to each other. Accordingly, the pixel processing unit 120 copies the N tile to the render target K 520 of the frame J.

Figure 6:
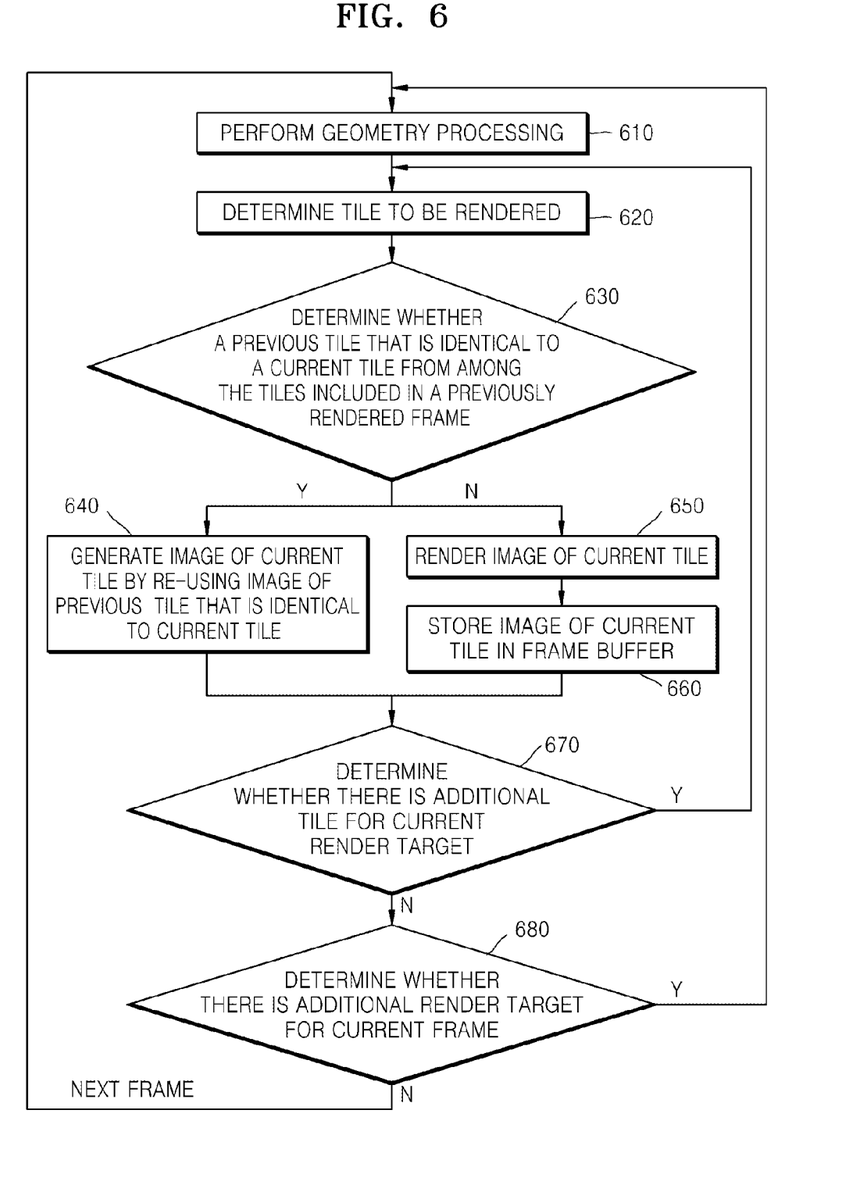
FIG. 6 is a diagram illustrating an example of a rendering method.

FIG. 6 is a diagram illustrating an example of a rendering method. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. FIG. 6 illustrates another rendering method of the rendering apparatus 100 of FIG. 2. Accordingly, the description of the rendering apparatus 100 is included in the description of the rendering method of FIG. 6. The description of FIGS. 1-5 is also applicable to FIG. 6, and thus will not be repeated here.

In operation 610, the rendering apparatus 100 receives a draw command to render a current frame, and performs geometry processing on the received draw command. The rendering apparatus 100 performs geometry processing in units of tiles.

In operation 620, the rendering apparatus 100 determines tiles to be rendered. The rendering apparatus 620 may sequentially render tiles included in the current frame.

In operation 630, the rendering apparatus 100 determines whether a previous tile is identical to a current tile from among the tiles that are included in a previously rendered frame. If a previous tile is identical to the current tile, the rendering method proceeds to operation 640, otherwise the method proceeds to operation 650.

In operation 640, the rendering apparatus 100 generates an image of the current tile by re-using an image of the previous tile that is identical to the current tile. The rendering apparatus 100 copies an image of the previous tile and uses the copied image as an image of the current tile. Thus, the rendering apparatus 100 omits a process of performing pixel processing on the current tile, and re-uses the image of the previous tile, thereby reducing the computational amount that is caused due to pixel processing.

In operation 650, the rendering apparatus 100 renders an image of the current tile. Since there is no previous tile that is identical to the current tile, the rendering apparatus 100 additionally performs rendering on the current tile.

In operation 660, the rendering apparatus 100 stores the image of the current tile in the frame buffer 170. Also, the rendering apparatus 100 stores the image and additional information of the current tile in the frame history buffer 160. The stored image and the stored additional information of the current tile may be-reused when a next frame is rendered.

In operation 670, the rendering apparatus 100 determines whether there is any additional tile for a current render target. When there is an additional tile, the rendering apparatus 100 returns to operation 620 and performs pixel processing on the additional tile, otherwise the rendering apparatus 100 proceeds to operation 680.

In operation 680, the rendering apparatus 100 determines whether there is any additional render target for a current frame. When there is an additional render target, the rendering apparatus 100 returns to operation 610 and performs geometric processing on the additional render target, otherwise the rendering apparatus 100 performs rendering on a next frame.

The rendering apparatus 100 may output a resulting image to a display device. The display device displays the received resulting image. The display device may be implemented as a liquid crystal display (LCD), a light-emitting diode (LED) display, a plasma display panel (PDP), an organic electroluminescent panel, a screen, a terminal, and the like. A screen may be a physical structure that includes one or more hardware components that provide the ability to render a user interface and/or receive user input. The screen can encompass any combination of display region, gesture capture region, a touch sensitive display, and/or a configurable area. The screen can be embedded in the hardware or may be an external peripheral device that may be attached and detached from the apparatus. The display device may be a single-screen or a multi-screen display. A single physical screen can include multiple displays that are managed as separate logical displays permitting different content to be displayed on separate displays although part of the same physical screen.

The rendering apparatus 100 may include at least one processor. Each of the geometry processing unit 110 and the pixel processing unit 130 included in the rendering apparatus 100 may be a logic circuit or a program included in an area of a processor. Alternatively, each of the geometry processing unit 110 and the pixel processing unit may be an individual processor.

As described above, since rendering is performed using a result of pixel processing of a previous tile that is identical to a current tile, the computational amount in geometry processing performed on the current tile may be reduced. Whether the current tile and the previous tile are identical to each other may be determined by comparing tile attributes of tiles, primitive lists included in the tiles, and render targets of the tiles. A resulting image of the previous tile may be copied, or may be used by using a pointer that indicates a storage space in which the resulting image of the previous tile is stored.

The processes, functions, and methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A rendering method comprising:
generating a primitive list by performing geometry processing on a current tile to be rendered;
determining whether the current tile is identical to a previous tile from among tiles included in a previously rendered frame; and
in response to the previous tile being identical to the current tile, generating, at a pixel processor, an image of the current tile by re-using an image of the previous tile,
wherein the determining comprises determining that the current tile is identical to the previous tile in response to the current tile and the previous tile being included in same render target, the current tile and the previous tile having same tile attributes, and the current tile and the previous tile including same primitive list.

2. The rendering method of claim 1, wherein the tile attributes comprises at least one of coordinates or a size of a tile.

3. The rendering method of claim 1, further comprising, in response to no previous tile being identical to the current tile, generating the image of the current tile by performing pixel processing on the current tile, and
generating a final image by combining images generated for all tiles included in a current frame.

4. The rendering method of claim 1, wherein the generating of the current image comprises generating of the current image by copying the image of the previous tile to an image area of the current tile.

5. The rendering method of claim 1, wherein the generating of the current image comprises generating of the current image by setting a pointer of an image area of the current tile to indicate an image area of the previous tile.

6. The rendering method of claim 1, wherein the previous tile comprises at least one of an image, information about a tile attribute, a processing order in which primitive lists are processed, or a draw identification (ID).

7. The rendering method of claim 1, wherein the previous draw command is determined to be identical to the draw command of the current tile based on a comparison of binding information of the current draw command with binding information of the previous draw command.

8. A rendering apparatus comprising:
a geometry processor configured to generate a primitive list by performing geometry processing on a current tile to be rendered; and
a pixel processor configured to determine whether the current tile is identical to a previous tile from among previous tiles included in a previous rendered frame, and to generate an image of the current tile by re-using an image of the previous tile in response to the previous tile being identical to the current tile,
wherein the pixel processor is further configured to determine that the current tile is identical to the previous tile in response to the current tile and the previous tile being included in same render target, the current tile and the previous tile having same tile attributes, and the current tile and the previous tile including same primitive list.

9. The rendering apparatus of claim 8, wherein the pixel processor determines that the current tile and the previous tile are identical to each other based on at least one of whether the current tile and the previous tile are included in same render target, the current tile and the previous tile have same tile attribute, or the current tile and the previous tile include same primitive list.

10. The rendering apparatus of claim 9, wherein the tile attribute comprises at least one of coordinates or a size of a tile.

11. The rendering apparatus of claim 8, wherein in response to no previous tile being identical to the current tile, the pixel processor is further configured to generate the image of the current tile by performing pixel processing on the current tile, and to generate a final image by combining images generated for all tiles included in a current frame.

12. The rendering apparatus of claim 8, wherein the pixel processor is further configured to re-uses the image of the previous tile by copying the image of the previous tile to an image area of the current tile.

13. The rendering apparatus of claim 8, wherein the pixel processor is further configured to re-uses the image of the previous tile by setting a pointer of an image area of the current tile to indicate an image area of the previous tile.

14. The rendering apparatus of claim 8, wherein the previous tile comprises at least one of an image, information about a tile attribute, a processing order in which primitive lists are processed, or a draw identification (ID).

15. The rendering apparatus of claim 8, wherein the previous draw command is determined to be identical to the draw command of the current tile based on a comparison of binding information of the current draw command with binding information of the previous draw command.

16. A non-transitory computer-readable recording medium having embodied thereon a program for executing the method of claim 1.

* * * * *